June 23, 1942.    J. WILSON    2,287,588
HAND BRAKE
Filed Nov. 10, 1939
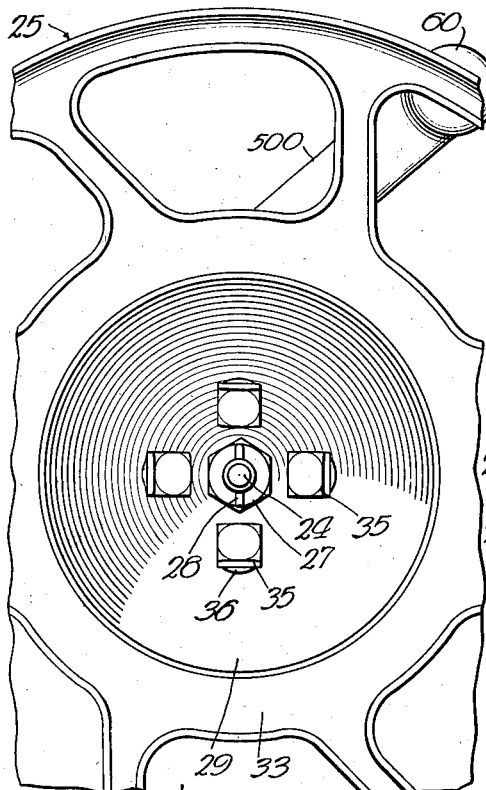
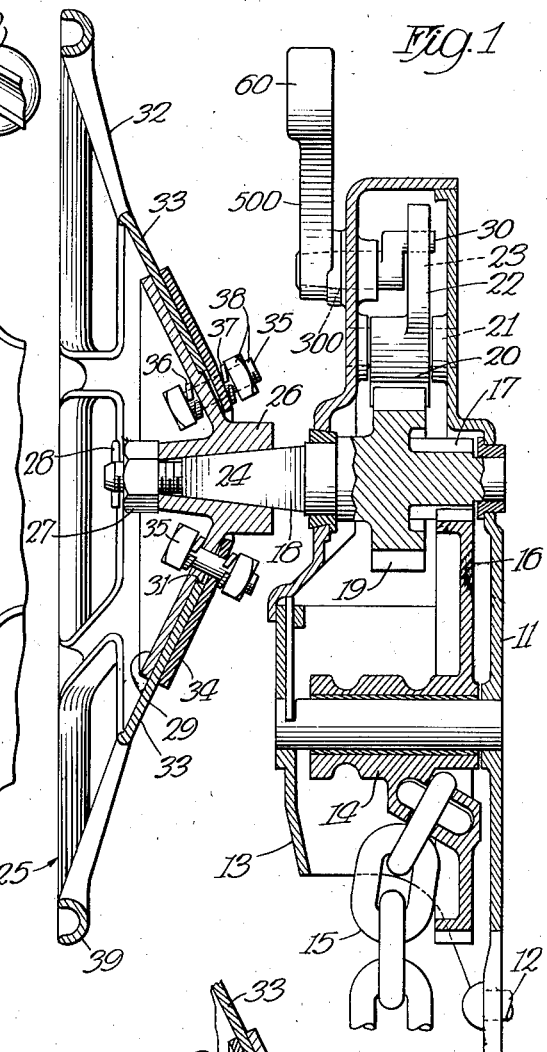
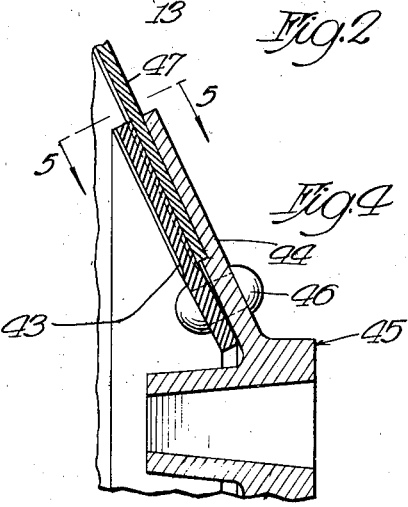
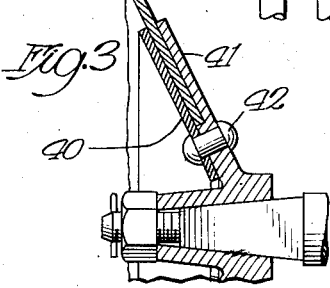
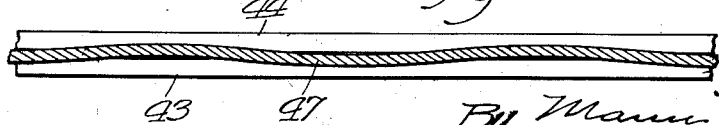
Inventor
Jack Wilson
By Mann, Brown
Attys Patented June 23, 1942

2,287,588

UNITED STATES PATENT OFFICE 2,287,588

HAND BRAKE

Jack Wilson, Chicago, Ill., assignor to Universal Railway Devices Company, a corporation of Delaware Application November 10, 1939, Serial No. 303,848

9 Claims. (Cl. 74—505)

This invention relates to railway brakes and more particularly to the hand operated type.

One of the objects of the invention is the provision of a new and improved means for attaching the brake lever or wheel member to the hub portions of a wheel for rotating said brake shaft.

Another object of the invention is the provision of new and improved means for yieldingly mounting the wheel member of a brake operating wheel on the hub portion thereof so that should the shaft be suddenly stopped while spinning on release, the momentum of the wheel member will be cushioned by the yielding connection between the wheel member and hub portion of the wheel.

A still further object of the invention is the provision of a new and improved connection between the wheel member and hub portion of a brake operating wheel that will hold the parts from relative rotation during the brake setting operation but will yield, when the momentum of the wheel exceeds a predetermined amount, upon sudden stoppage of the brake operating shaft.

A further object of the invention is the provision of a new and improved yielding connection between the wheel member and hub portion of a brake operating wheel, that is simple in construction, easily and readily assembled and that is efficient in operation.

Other and further objects and advantages of the invention will appear from the following description, taken in connection with the accompanying drawing, in which—

Fig. 1 is a transverse vertical section of a conventional brake operating mechanism showing the invention in position thereon;

Fig. 2 is a view at right angles to that shown in Fig. 1, with parts broken away;

Fig. 3 is a cross-section of a slightly modified form of the construction shown in Fig. 1, with parts broken away;

Fig. 4 is a transverse vertical section of the brake wheel showing a modified form of construction, with parts broken away; and Fig. 5 is a section on the line 5—5 of Fig. 2 showing a development on an enlarged scale.

In releasing the type of brakes in which the hand wheel spins with the brake shaft, it is not uncommon for the brakeman, in order to prevent overrunning of the brake drum, or to reset the holding pawl, to throw the pawl operating lever into holding position while the wheel is rotating at high speed, with the result that the great momentum of the wheel, due to its weight and velocity will exert a more or less strain on the mechanism. The present invention seeks to provide shock absorbing or cushioning means for reducing this strain to a minimum.

Referring now to the drawing, the reference character 10 designates generally a brake operating mechanism. This device comprises a wall or base plate 11 which is adapted to be attached to the end wall of the car as by means of the bolts or rivets 12 and a front or cover plate 13 which is adapted to be secured to the back or wall plate for housing the operating mechanism.

The operating mechanism comprises a drum 14, rotatably mounted on a shaft within the casing formed by said plates, on which is adapted to be wound a chain or cable 15 to which is attached the brake lever mechanism in the usual manner. The brake drum is provided with a gear 16 which is adapted to be operated by a pinion 17 on the brake or power shaft 18 journaled in said plates.

Suitable mechanism is provided for holding the shaft 18 in adjusted position when the brakes are applied. As shown, the shaft 18 is provided with a ratchet 19 which is adapted to be engaged by a pawl 20, pivoted on the shaft 21 and having an upstanding arm 22 provided with an arcuate slot 23 in which a crank 30 on the shaft 40 engages. The shaft 300 is operated by a handle member 500. The handle member 500 is enlarged at its outer end as at 60, whereby, when it is swung to one side of dead center, it will hold the pawl in locked position and when swung to the opposite side, it will release the pawl and hold it in inoperative position.

Since the details of the mechanism thus far described constitute no part of the present invention, it is not thought necessary to further illustrate or describe the same.

The shaft 18 is provided with a tapered outer end 24, rectangular in cross-section, on which the brake wheel 25 is mounted. The brake wheel 25, in Figs. 1 and 2, comprises a hub portion 26 and a wheel member or wheel rim member 32. The hub portion 26 has a corresponding tapered opening for receiving the spindle or tapered portion 24 of the brake operating shaft 18. A nut 27 holds the parts in assembled relation and a cotter pin 28 may be employed for preventing the removal of the nut.

The hub portion 26 is provided with a cone-shaped flange 29 having a rabbet 31 extending about the edge portion of the flange 29 or wheel rim member. The wheel member 32 has a tapered inner or web portion 33 which is adapted to be frictionally connected to the flange portion 29. As shown, the inner or web portion 33 may have openings therein for lightening the structure, if desired. It is provided with an axial opening through which the inner end of the hub portion extends so that the web portion 33 of the wheel member may seat in the rabbet 31, as clearly shown in Fig. 1. The depth of the rabbet is preferably, though not necessarily, less than the thickness of the web portion 33 and is held in position in said rabbet by a conical disk 34 which is secured in position by a plurality of bolts 35. The inner or web portion 33 is adapted to be clamped between the flange 29 and the conical disk 34. Preferably, though not necessarily, spring washers 36 and 37 are inserted between the head of the bolt and the flange portion 29 and between the nut 38 on the bolt 35 and the disk 34.

Since the web portion 33 is between the flange portion 29 and the disk 34, the parts may be clamped together by means of the nuts 35 and 38 with sufficient pressure to frictionally hold them from relative movement when the brake is applied but will permit the wheel member to have an angular movement relative to the hub portion, the extent of which depends on the momentum of the wheel and the amount of friction developed. This friction will cushion the shock when the brake is released and the pawl thrown suddenly into engagement with the ratchet while the wheel is rotating at high speed. The outer end of the wheel member 32 is provided with the usual circular hand hold or rim 39 by means of which the brake may be manually applied.

The construction shown in Fig. 3 differs from that just described in that the clamping disk member 40 is placed on the outer instead of the inner side of the flange 41 and the parts are permanently connected in clamping relation by means of rivets 42 instead of bolts and spring washers, as in the previous construction.

In the form of the device shown in Fig. 4, the disk member 43 is on the outer side of the flange 44 of the brake wheel 45 and is riveted thereto as by means of the rivets 46. In this form of construction, the flange 44 and the disk member 43 are provided with complementary sinuous adjacent surfaces. The web 47 of the wheel member 50 has sufficient resiliency that when the parts are clamped together, it will be distorted to conform to the sinuous surfaces of the flange and disk portions, as shown in Fig. 5.

The distortion of the web 47 as shown in Fig. 5 has been exaggerated to more clearly show the structure. In this form of construction, the momentum of the wheel upon a sudden stopping of the brake shaft will cause the wheel member to continue to rotate relative to the hub portion and shaft and this rotation will cause the web 47 to undulate to conform to the inner surfaces of said flange and disk portions during its rotation. It will thus be seen that in all forms of the device, upon a sudden stopping of the brake shaft after the wheel has attained considerable momentum, the outer portion of the wheel, that is the wheel member, will continue to move until the friction overcomes such momentum thereby cushioning the movement of the wheel member and preventing sudden strain on the brake operating mechanism. This relative movement need not be very great, between an eighth and a quarter of a turn being amply sufficient to prevent any substantial strain on the mechanism.

It is thought from the foregoing, taken in connection with the accompanying drawings, that the construction and operation of my device will be apparent to those skilled in the art and that changes in size, shape, proportion or detail may be made without departing from the spirit and scope of the appended claims.

I claim as my invention:

1. In a railway brake, a brake operating shaft, ratchet mechanism, including a ratchet wheel fast on said shaft, for holding said shaft in brake holding position, a brake wheel member for operating said shaft, friction means for yieldingly connecting said wheel member to said shaft, and means for varying the pressure on said friction means.

2. In a brake operating mechanism, a brake drum, means for operating said drum from said shaft, a wheel member for operating said shaft, and friction means in the connection between said wheel member and the remaining portion of said brake operating mechanism for operatively connecting said wheel member to said shaft for causing the same to move together, due to friction, in applying the brakes and for gradually stopping the rotation of said wheel member when said mechanism is suddenly stopped while spinning during the release of the brakes.

3. In a brake operating mechanism, a drum, a brake shaft, a brake shaft gearing between said shaft and drum, a hub on said shaft, said hub having a flange thereon, a comparatively heavy wheel member, and adjustable means for clamping said member and flange into frictional engagement with one another, said means being so adjusted that the friction between said flange and wheel member will be such that said wheel member may be operated manually for rotating said drum for applying the brakes but not such as to prevent a limited relative rotation between said drum and shaft due to the inertia of said wheel member when said shaft is suddenly stopped upon the spinning of said shaft and wheel member upon releasing the brakes.

4. In a railway brake, brake operating mechanism for applying brakes on a railway car, said mechanism comprising a brake shaft, a hub portion rigidly mounted on said shaft, a wheel rim member, means, including pressure operated mechanism, for frictionally connecting said wheel rim member to said hub portion, and means for varying the pressure on said mechanism.

5. In a railway brake, brake operating mechanism comprising a brake shaft, a hub secured to said shaft and having a conical flange extending about the same, said flange having an annular rabbet adjacent its periphery, a wheel member having a web portion seated in said rabbet, said rabbet being of less depth than the thickness of said flange, a disk member, and means for adjustably clamping said web portion between said disk member and flange.

6. In a railway brake, brake operating mechanism comprising a brake shaft, a hub secured to said shaft and having a conical flange extending about the same, said flange having an annular rabbet adjacent its periphery, a wheel member having a web portion seated in said rabbet, a disk member, and means for rigidly connecting said disk member and flange together for clamping said web portion therebetween.

7. In a railway brake, brake operating mechanism comprising a brake shaft, a hub secured to said shaft and having a conical flange extending about the same, said flange having an annular rabbet adjacent its periphery, a wheel member having a web portion seated in said rabbet, a disk member, and means for clamping said web portion between said disk member and flange, the web engaging surfaces of said disk member and flange being complementarily sinuous for gripping said web portion.

8. In a railway brake, brake operating mechanism for applying brakes on a railway car, said mechanism comprising a brake shaft, a hub on said shaft, a flange member carried by said hub, a wheel member, means for frictionally connecting said wheel member to said flange member, the friction between said wheel and flange members being such as to cause the same to rotate together when the brakes are applied, said means including mechanism for distorting one of said members upon relative rotation of said members.

9. In a railway brake, a drum, means including a brake shaft and winding mechanism for rotating said drum for applying the brakes, a pawl for holding said shaft from rotating in one direction, means for releasing said pawl, a brake wheel member, means for frictionally and yieldably connecting said wheel member to said shaft, the friction being such as to constitute the sole means for connecting said wheel member to said shaft for causing said shaft to turn with said wheel member when the brakes are applied by rotating said wheel member, the frictional connection being such that when said pawl is suddenly moved to operative position during the spinning of said shaft upon releasing the brakes, said wheel member may rotate slightly relative to said shaft for cushioning the shock incident to throwing the pawl into operative position during the release of the brake winding mechanism.

JACK WILSON.

CERTIFICATE OF CORRECTION.

Patent No. 2,287,588. June 23, 1942.

JACK WILSON.

It is hereby certified that error appears in the printed specification of the above numbered patent requiring correction as follows: Page 1, second column, lines 53 and 54, strike out the words "flange 29 or wheel rim member. The wheel member 32" and insert instead --flange 29. The wheel member or wheel rim member 32--; page 2, second column, line 19, claim 2, after "mechanism," insert --a brake shaft,--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.